United States Patent [19]

Morini

[11] 4,127,198
[45] Nov. 28, 1978

[54] DEVICE FOR POSITIONING A METAL SHEET ON A TRANSFER CONVEYOR

[76] Inventor: Rino Morini, Via San Francesco 35, Imola, (Bologna), Italy

[21] Appl. No.: 785,994

[22] Filed: Apr. 8, 1977

[30] Foreign Application Priority Data

Apr. 14, 1976 [IT] Italy .................................. 3403 A/76

[51] Int. Cl.² .......................................... B65Q 47/91
[52] U.S. Cl. .................... 214/1 BT; 83/152; 83/268; 83/280; 198/345; 214/1 F; 214/1 S; 271/236; 271/250
[58] Field of Search .................. 214/1 R, 1 BB, 1 BT, 214/1 S, 8.5 D, 6 S, 1 F; 198/597, 486, 344, 345; 271/13, 15, 17, 94, 227, 228, 233, 241, 236, 250, 239, 244, 245, 247, 253, 237, 184, 196, 197; 83/23, 35, 268, 152, 163, 279, 280, 705, 752

[56] References Cited

U.S. PATENT DOCUMENTS

| | | | |
|---|---|---|---|
| 1,014,269 | 1/1912 | Tichborne | 271/236 |
| 3,662,635 | 5/1972 | Yabuta | 271/236 X |
| 3,701,643 | 10/1972 | Frank | 198/345 X |
| 4,027,591 | 6/1977 | Gubela | 271/236 X |

FOREIGN PATENT DOCUMENTS 617,108 8/1935 Fed. Rep. of Germany ............. 271/58

Primary Examiner—Frank E. Werner
Attorney, Agent, or Firm—Guido Modiano; Albert Josif

[57] ABSTRACT

A device for positioning a metal sheet on a transfer conveyor comprises a support surface for the sheet, guides extending parallel to the conveyor, a carriage slidably supported on the guides, sheet gripping clamps supported on the carriage, reference stops for the longitudinal and transverse positioning of the sheet relative to the conveyor feed direction, jacks for moving the gripping clamps between a position in which they pick up the sheet on the support surface and a position in which they abut against the transverse reference stops, and drive means for the carriage.

8 Claims, 5 Drawing Figures

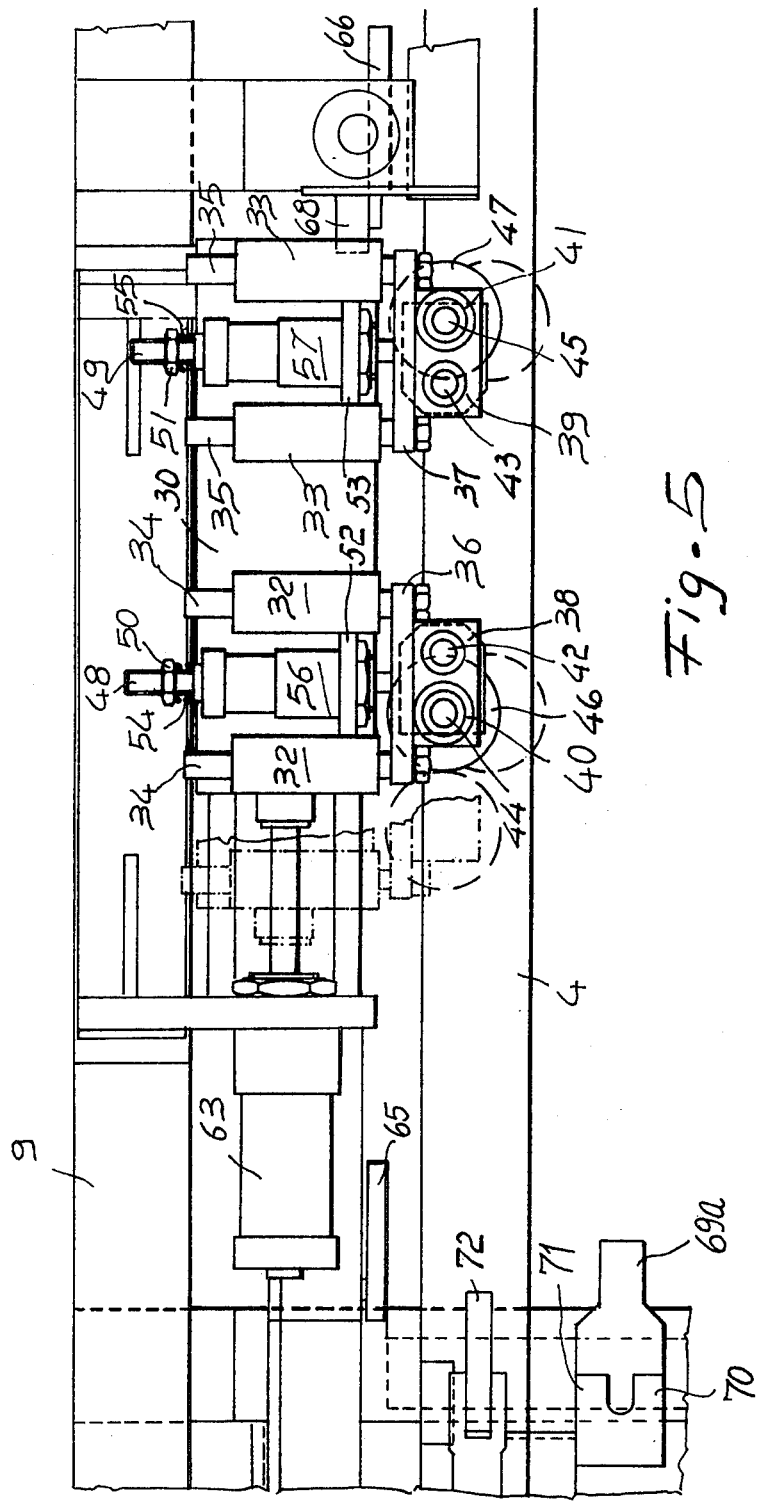

DEVICE FOR POSITIONING A METAL SHEET ON A TRANSFER CONVEYOR

BACKGROUND OF THE INVENTION

This invention relates to a device for positioning a metal sheet on a transfer conveyor. The invention is particularly directed towards positioning rectangular sheets in such a manner that their sides are parallel and perpendicular respectively to the conveyor feed direction.

The need to position metal sheet is a requirement in numerous technical fields. For example such a requirement exists in equipment for manufacturing screw caps in which, for proper operation and rational utilisation of the metal sheets, these latter must be perfectly positioned under the forming and blanking punches and dies.

SUMMARY OF THE INVENTION

The object of the present invention is to provide a device able to solve the aforesaid problem by a simple structure of easy construction, and offering wide flexibility of utilisation in consideration of the various sizes on which it is required to operate.

The said object is attained by a device for positioning a metal sheet on a transfer conveyor, comprising a support surface for the sheet lying substantially in the plane of the conveyor, guides extending parallel to the conveyor, a carriage slidably supported on said guides, sheet gripping means supported on said carriage and mobile perpendicular to the carriage sliding direction, reference stops for the longitudinal and transverse positioning of said sheet relative to the conveyor feed direction, means for moving said gripping means between a position in which they pick up the sheet on said surface and a position in which they abut against said transverse reference stops, and drive means for said carriage, to bring the sheet after its transverse positioning into abutment against the longitudinal reference stops.

BRIEF DESCRIPTION OF THE DRAWINGS

Further characteristics of the present invention will be more evident from the detailed description given hereinafter of a preferred embodiment illustrated by way of example in the accompanying drawings in which:

FIG. 5 is a plan view of the parts shown in FIG. 2.

DESCRIPTION OF THE PREFERRED EMBODIMENTS

Figure 1:
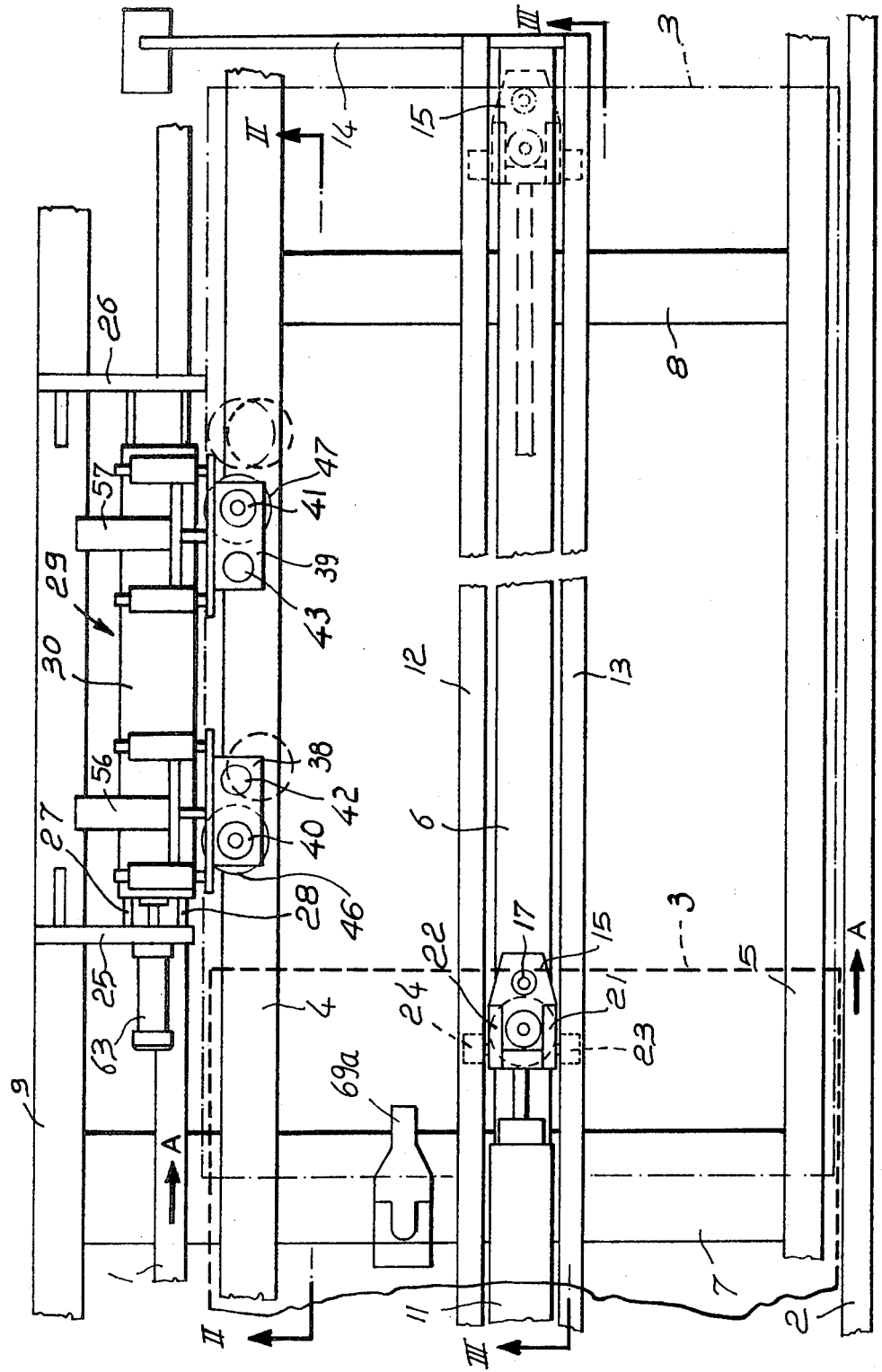
FIG. 1 is a partially diagrammatic plan view of the device according to the invention.

With reference to said figures, in which the same members are indicated by the same reference numerals, the numerals 1, 2 indicate the two belts constituting the feed conveyor for feeding the sheets for example to a blanking and forming press for caps. In the case considered, the sheets are rectangular metal sheets 3. When they have been positioned such that their longitudinal sides are parallel to the belts 1, 2, suitable grips (not shown) provided on the belts grip them on their two opposing sides and transfer them downstream.

The arriving sheets are taken from a store and transferred in a manner not illustrated on to a support surface composed of plates 4, 5, 6 parallel to the belts 1, 2 and fixed to cross members 7, 8 which rest on side pieces, of which only that indicated by 9 is visible on the drawing.

Between the side pieces, but at a certain distance from the plates 4–6, there extends a further cross member 10 supporting a hydraulic jack 11. The axis of this jack is parallel to the feed direction of the belts 1 and 2 and indicated by A. Two parallel sections of opposing C cross-section 12, 13 are rigid with the cross member 10 to the sides of the jack 11. The ends of the sections 12, 13 are connected to a bracket 14 which projects above the plates 4–6 from the side piece 9 to which it is fixed.

Figure 3:
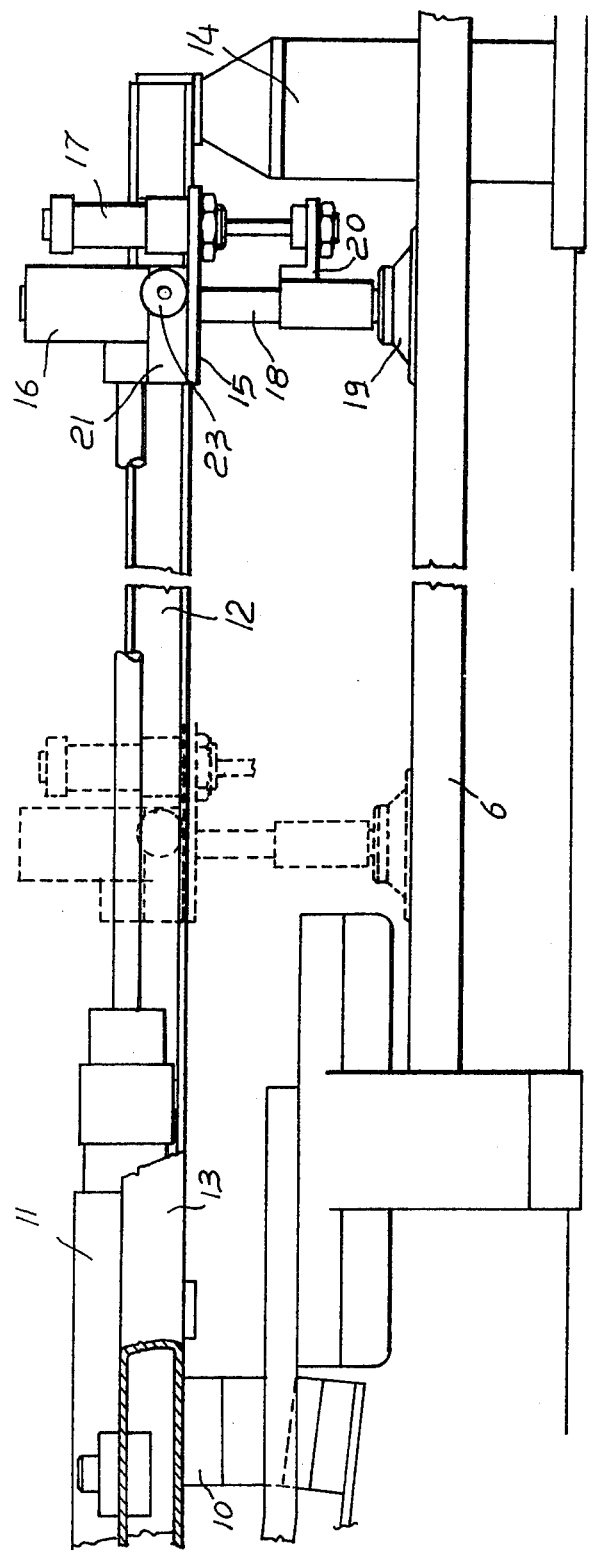
FIG. 3 is a longitudinal elevation on the line III—III of FIG. 1.

The rod of the jack 11 comprises at its end a bracket 15 on which a vertical sleeve 16 is fixed. On the bracket 15 there is also flanged a hydraulic jack 17, the rod of which projects below the bracket 15. A rod 18 lowerly carrying a gripping member or sucker 19 is guided in the sleeve 16 and is connected to the rod of the jack 17 by an angle bracket 20. The sucker 19 is connected via flexible tubes, not shown, to a vacuum source so as to grip the sheet on which it is rested, as will be evident hereinafter. The bracket 15 is provided on its sides with a pair of lugs 21, 22 from which project respective idle rollers 23, 24. These rollers are guided inside the sections 12, 13 and serve to support the sucker 19 and jack 17 during the to-and-fro movements of the rod of the jack 11, from the position shown by dashed lines in FIG. 3 to the position shown by full lines.

Two right angled plates 25, 26 are fixed spaced apart on top of the side piece 9, and comprise a vertical portion projecting horizontally. The ends of a pair of parallel rods 27, 28 are rigid with the projecting portions to act as guides for a carriage indicated overall by 29.

This carriage comprises a rectangular plate 30 to the bottom of which are fixed four bushes 31 of which two slide on the rod 27 and the other two on the rod 28.

Figure 2:
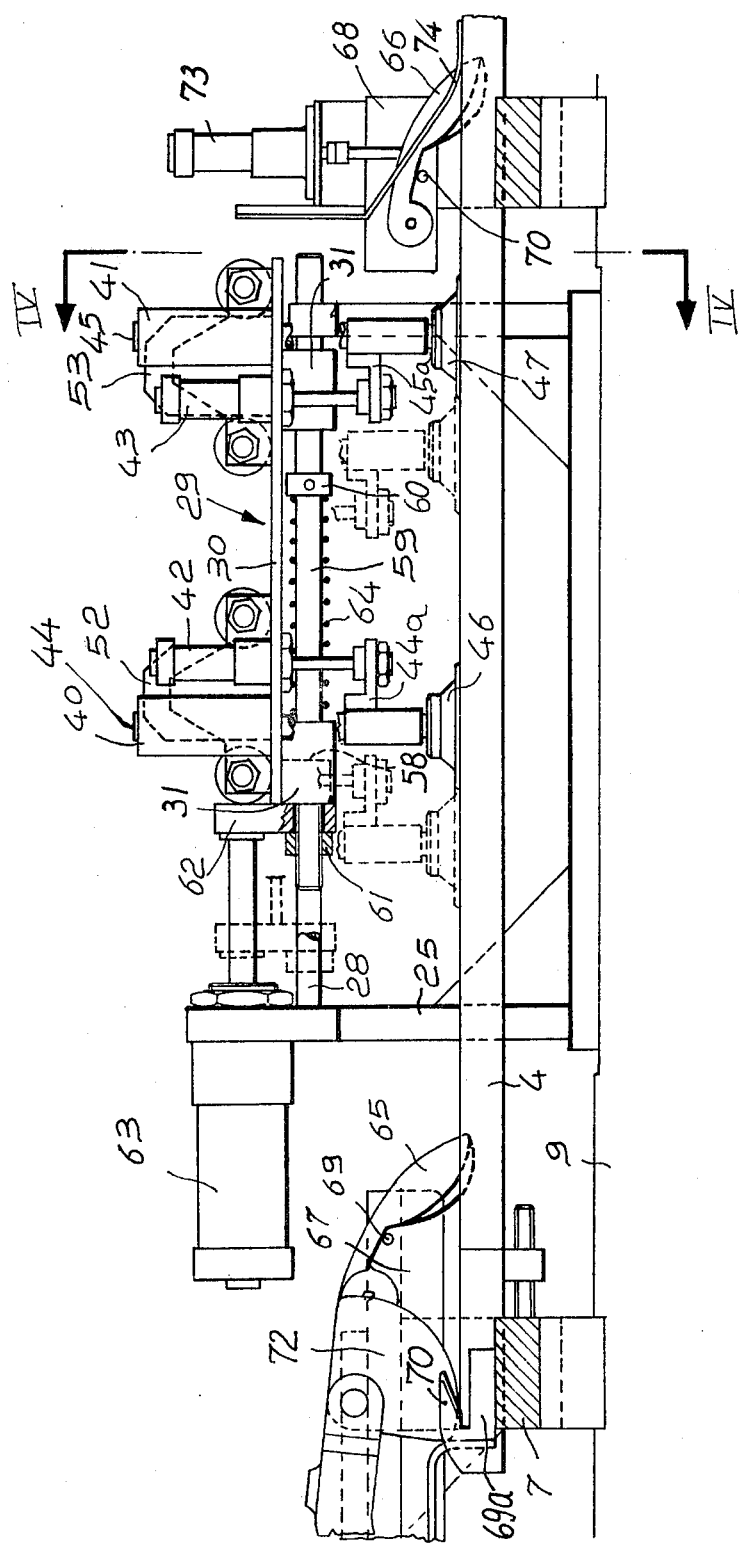
FIG. 2 is a sectional elevation on the longitudinal line II—II of FIG. 1.
Figure 4:
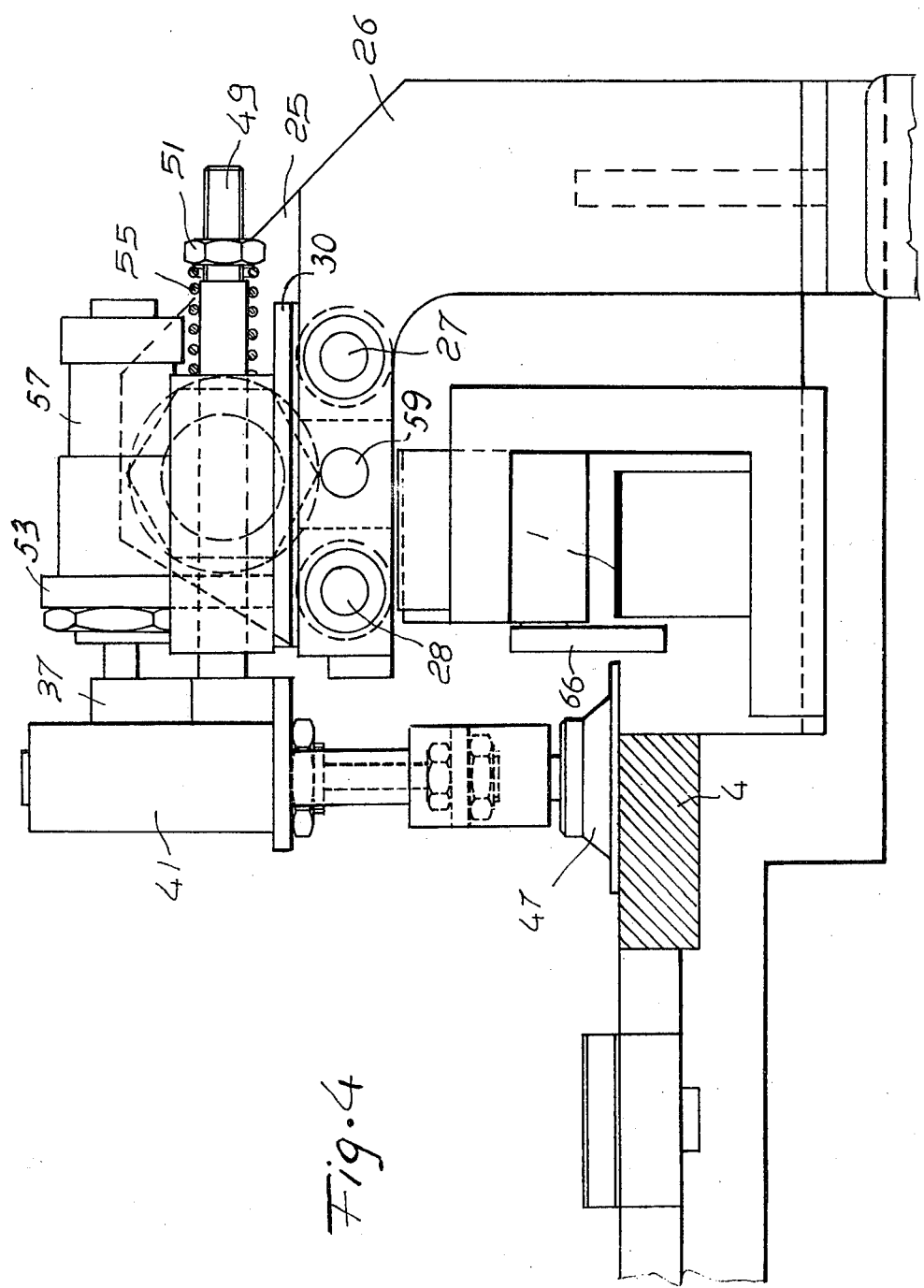
FIG. 4 is a cross-sectional elevation on the line IV—IV of FIG. 2.

On the plate 30 are fixed two pairs of parallel sleeves 32, 33 (FIG. 5) normal to the rods 27, 28. The sleeves 32, 33 are traversed axially by respective pairs of rods 34, 35 connected together by plates or links 36, 37 at those ends facing the plate 6. Brackets 38, 39 are welded to the bottom of the links 36, 37 and project outside the plate 30, to carry respective vertical tubes 40, 41 and jacks 42, 43. In the tubes 40, 41 are guided rods 44, 45 which carry at their lower ends gripping means constituted by suckers 46, 47 connected to a vacuum source in a like manner to the sucker 19. The rods of the jacks 42, 43 are connected to the rods 44, 45 by angle pieces 44a, 45a (FIG. 2). The return of the rods 34, 35 is determined by an elastic return unit comprising (see FIG. 4) threaded shanks 48, 49 with one end rigid with the links 36, 37 and the other end engaged by nuts 50, 51. The shanks 48, 49 traverse flanges 52, 53 rigid with the plate 30. Between the flanges 52, 53 and nuts 50, 51 are disposed return springs 54, 55 operating under compression. The suckers 46, 47 move against the action of the springs 54, 55 by means of two jacks indicated by 56, 57, the cylinders of which are fixed to the plate 30 between the sleeves 32 and 33, their rods being connected to the links 36, 37.

Below the plate 30 and immediately below the left hand front edge of FIG. 2 there is welded a bar 58 located between the pair of bushes engaged respectively by the guide rods 27 and 28. The bar 58 comprises a central bore through which a stem 59 is led, and on which is dowelled a ring 60 in an approximately central position.

The stem 59 is guided at one end in the plate 26 and is provided at the other end with a thread. On this thread is screwed a nut 61 between which and the bar 58 there is an arm 62 radially keyed on to the rod of a hydraulic jack 63 to drive the carriage 29 along the guides and rods 27, 28.

The cylinder of the jack 63 is flanged to the plate 25 and its axis is parallel to the rods 27, 28. The stem 59 traverses the arm 62 which is resiliently connected to the carriage 29 via a cylindrical spring 64 disposed between the bar 58 and the ring 60 against which it abuts.

As will be described in greater detail hereinafter, the positioning of the sheets is accomplished by abutment against reference stops represented by lever 65, 66 (FIGS. 2, 5) supported to swing on brackets 67, 68 rigid with fixed parts of the device.

The levers 65, 66 normally rest on pegs 69, 70 so that their free rounded ends interfere with the plane in which the sheets lie, and coinciding with the upper surface of the plates 4–6.

The levers 65, 66 serve for laterally positioning the sheets.

For the longitudinal positioning there is provided a reference stop constituted by a plate 69a fixed on the cross member 7 in a longitudinally adjustable manner. The plate 69a comprises a pair of upper projections 70, 71 which project in the direction A to form a lead-in for the sheets to be positioned. Finally the reference numeral 72 indicates freely swinging sectors arranged to keep the sheets lowered, in particular during their positioning against the longitudinal stop 69a.

The operation of the described device is as follows.

It will be assumed that the device is in the condition of FIG. 1 with the jack 11 in the position shown by full lines, with the suckers 46, 47 and sheet 3 in the position shown by dashed lines.

A suitable sensor which detects the presence of the sheet 3 operates the jack 17 which causes the sucker 19 to adhere to the upper face of the sheet lowerly supported by the plate 6. The jack 11 then extends to drag the sheet in the direction A until a suitable limit switch causes it to stop in the position shown by a dashed and dotted line in FIG. 1. In this position the sheet has its upstream edge and left hand edge, relative to the feed direction A, distanced from the relative lateral and longitudinal stops. At this point the jacks 42, 43 are made to descend, and with simultaneous operation of the suckers 46, 47 the sheet 3 is picked up at its left hand lateral edge. The jacks 56, 57 which up to this moment were in their extended position, are then connected to discharge. Due to the effect of the springs 54, 55 the suckers 46, 47 are moved laterally so as to bring the lateral edge of the sheet into contact with the levers 65, 66 so determining the transverse positioning of the sheet. With a certain lag, determined by a timer, the control is given for operating the jack 63 which, by shortening, brings the rear edge of the sheet 3 to abut against the stop 69, so determining the longitudinal positioning. When positioning has been achieved, the grips on the belts 1, 2 grip the sheet at its lateral edges and transfer it towards the downstream equipment, e.g. towards a blanking and forming press for screw caps.

The described stages are repeated on each arrival of a sheet, such that when the sheet is picked up and moved laterally by the suckers 46, 47 it is abandoned by the sucker 19 which returns to its initial position.

The described invention completely attains the said objects. In particular, it should be noted that the sheet is brought into abutment against the stop levers 65, 66 by springs 54, 55 which ensure the necessary elastic thrust and prevent deformation of the sheet due to excessive pressure. Likewise, the abutment of the rear edge of the sheet against the stop 69 is cushioned by the spring 64 which neutralises any excessive stroke of the jack 63.

Various modifications may be made to the practical embodiment of the invention within the scope of protection. Thus the lateral stop levers may be raised to avoid any movement of the sheet during its forward movement as a consequence of the lateral edge of the sheet sliding against the levers 65, 66. These latter may be raised by a jack 73 as shown in FIG. 2 in relation to the lever 66. Finally, to prevent the sheet assuming an undulated shape, resilient strips 74 may be provided to keep the sheet adhering to the plate 4.

The shapes and dimensions may be chosen at will in accordance with the dimensions of the sheet and the material of which it is made.

I claim:

1. A device for positioning a metal sheet on a transfer conveyor, comprising a support surface for the sheet lying substantially in the plane of the conveyor, guides extending parallel to the conveyor, a carriage slidably supported on said guides, sheet gripping means supported on said carriage and mobile perpendicularly to the carriage sliding direction, reference stops for the longitudinal and transverse positioning of said sheet relative to the conveyor feed direction, means for moving said gripping means between a position in which they pick up the sheet on said surface and a position in which they abut against said transverse reference stops, and drive means for said carriage, to bring the sheet, after its transverse positioning, into abutment against the longitudinal reference stops.

2. A device as claimed in claim 1, wherein said gripping means comprise suckers mobile perpendicularly to the sheet support surface by means of jacks, and supported together with these latter on brackets fixed to rods guided in sleeves rigid with said carriage and perpendicular to the direction of sliding of said carriage, said brackets being movable in the direction which causes a longitudinal edge of the sheet to abut against reference stops by means of elastic elements, and in the opposite direction, by jacks rigid with said carriage.

3. A device as claimed in claim 1, wherein said means for moving said carriage comprise a jack with its rod elastically connected to said carriage.

4. A device as claimed in claim 1, wherein the stops for the transverse positioning of the sheet comprise a pair of levers supported such that they can swing, and with their free ends interfering with the plane in which the sheet lies, said levers swinging in a plane parallel to the feed direction of the conveyor.

5. A device as claimed in claim 1, wherein the stop for longitudinally positioning the sheet comprises a plate upperly provided with appendices projecting forwards and constituting lead-ins for deviating a transverse edge of the sheet against said reference stop.

6. A device as claimed in claim 1, comprising a gripping member arranged to grip the sheet arriving on the support surface and mobile in the conveyor feed direction to bring the sheet into the range of action of said gripping means.

7. A device as claimed in claim 6, wherein said gripping member comprises a sucker mobile vertically by a jack, said sucker and said jack being supported by a bracket rigid with the end of a jack rod the axis of which is parallel to the conveyor feed direction and positioned above the sheet.

8. A device as claimed in claim 7, wherein said bracket is provided with idle rollers which project laterally and are slidable in guides supported above the plane in which the sheet lies, and parallel to the conveyor feed direction.

* * * * *